UNITED STATES PATENT OFFICE.

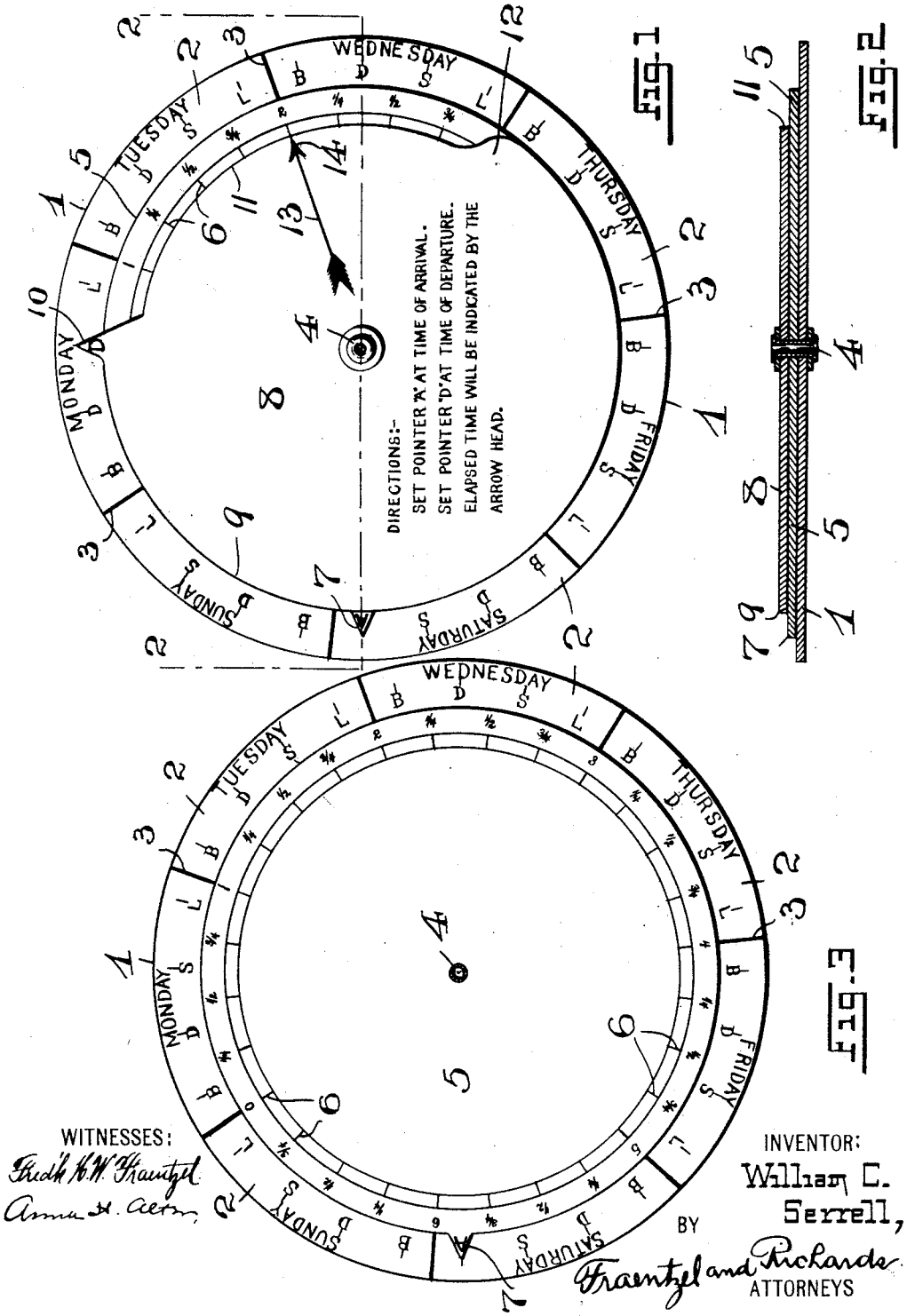

WILLIAM C. SERRELL, OF BUFFALO, NEW YORK, ASSIGNOR OF ONE-HALF TO JOHN H. SMITH, OF EAST ORANGE, NEW JERSEY.

TIME-COMPUTER.

1,171,753.     Specification of Letters Patent.     Patented Feb. 15, 1916.

Application filed March 1, 1909. Serial No. 480,510.

*To all whom it may concern:*

Be it known that I, WILLIAM C. SERRELL, a citizen of the United States, residing at Buffalo, in the county of Erie and State of New York, have invented certain new and useful Improvements in Time-Computers; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to that class of devices known in the art as time-computers; and, the invention has reference, more particularly, to a novel device which shall be of a very simple construction and shall provide an effective and reliable means for accurately determining an elapsed space of time.

The invention has for its principal purpose to provide a neatly and simply constructed device or appliance which is easily manipulated, and is especially adapted for use by travelers in hotels in accurately determining the time which has elapsed between the time of arrival and the time of departure from the hotel.

The principle upon which the device is based is, that any period of time, that repeats itself, may be regarded as a cycle, and may be graphically represented as a circle, the difference between any two points in the circle being represented by an arc, the length of which is pro-portionate to the entire circumference of the circle, as the elapsed space of time is to the space of time represented by the complete circle.

Other objects of this invention not at this time more particularly enumerated will be clearly understood from the following detailed description of my present invention.

The invention is clearly illustrated in the accompanying drawings, in which:—

Figure 1 is a plan view of a time-computing device showing one embodiment of the principles involved in the present invention; and Fig. 2 is a transverse section of the device, said section being taken on line 2—2 in said Fig. 1, said views showing an arrangement of three centrally pivoted computing disks. Fig. 3 is a plan view of the device, with the upper or indicator disk removed, said view showing more particularly the arrangement of the graduations or scales upon the two lower disks.

Similar characters of reference are employed in the said above described views, to indicate corresponding parts.

Referring now to the figures of the drawings, in which is shown one form of device for determining the elapsed space of time, the reference-character 1 indicates a suitable base-plate or disk which is preferably of a circular marginal configuration, and which is divided into seven marginal spaces or divisions 2 by means of the radial lines 3, and the several spaces or divisions 2 being each provided with a word designating a day of the week, substantially as illustrated in said Figs. 1 and 3 of the drawings. Rotatably arranged upon the said base-plate or disk 1, and upon a suitable rivet or eyelet. as 4, is an intermediate disk or plate 5, which is of smaller diameter than the section 1. The said section or plate 5 is provided with a series of radial divisions or graduations, as 6, the space between each pair of graduations indicating practically one-quarter of a day, and being preferably numbered in sequence, from 0, $\frac{1}{4}$, $\frac{1}{2}$, $\frac{3}{4}$, 1 and so on to $6\frac{3}{4}$, inclusive, as clearly illustrated in Fig. 3 of the drawings. The said disk or plate 5 is also provided at a pre-determined point upon its marginal edge with a projection or extension 7, in the form of a pointer or index, which extends into and is movably disposed over the marginal spaces 2 of the base-plate or disk 1. Upon its upper face, the said pointer or index 7 may be provided with a letter "A," designating the word arrival.

As shown in Figs. 1 and 3 of the drawings, each space 2 of the main base-plate or disk 1 is provided with the capital letters, "B," "D," "S" and "L," designating, respectively, the words breakfast, dinner, supper, and lodging. Rotatably arranged upon the said plate or disk 5 and upon the rivet or eyelet 4 is a top or face-plate or disk 8, which is provided with a marginal edge-portion 9 extending over and covering a portion of the divisions or graduations 6 of the plate or disk 5, said portion 9 being movably disposed above the said divisions or graduations 6. At one end of the said marginal edge-portion 9 of the said plate disk 5 is a projection or extension 10, in the form of a pointer or index, which extends into and is movably disposed upon the marginal spaces 2 of the base-plate or disk 1. Upon its upper face, the said pointer or index 10 may be provided with a letter "D," said letter designating the word departure. The said disk or plate 8 is also made with a marginal cut-away portion, as 11, extending from the base of said projection or extension 10 to a point 12 upon the marginal edge-portion 9 of the said disk or plate 8, as clearly shown in Fig. 1 of the drawings. Upon its upper face, the said disk or plate 8 is provided at a predetermined point with a suitably formed and preferably arrow-shaped index or pointer, as 13, having its spear-shaped end 14 terminating at the marginal edge of said cut-away portion 11. The upper face of the said disk or plate 8 may also be provided with the words:—"Directions:—Set pointer A at time of arrival. Set pointer D at time of departure. Elapsed time will be indicated by the arrow-head."

From an inspection of Fig. 1 of the drawings, it will be readily seen, that the pointers 7 and 10 are in effect the points of a caliper which measure the length of the chord of an arc between any two desired points of the circumference of the base-plate or disk 1, while the subdivisions of the movable disk or plate 6 by means of the pointer or index 13 upon the top or face-plate 8 give a numerical reading of this distance, said reading in this instance indicating an elapsed space of time.

Having thus in a general way described the construction of the device, I will now set forth the manner of operating the device and co-incident therewith I will give an illustration or example for computing such elapsed space of time.

The intermediate plate or disk 5 is moved upon its pivotal post 4, and the pointer 7 is set directly opposite or over the letter in the space 2, indicating the beginning of the period required to be measured. The pointer 10 of the top or face-plate 8, by moving said plate or disk upon the pivotal post 4, is placed directly opposite or over the letter in the space 2, indicating the end of the said period. The distance between the said two pointers, as set, will represent the proportionate distance between the end and the beginning, and the lapse of time will be indicated by the indicator or pointer 13 by having its end 14 pointing to the proper number upon the intermediate disk or plate 5. For example, suppose the guest of a hotel arrives upon a Saturday, after supper, and leaves on the following Monday after supper. To determine the exact space of time which has thus elapsed, in this instance, two days, the index or pointer 7 is placed over the letter L in the space provided with the word Saturday, and the index or pointer 10 is placed over the letter S in the space provided with the word Monday. Now, turning to the indicator or pointer 13 it will be seen that its index-point or arrow-head 14 points directly to and is in alinement with a graduation 6 opposite which is the numeral 2, thus designating to the operator that exactly two full days have elapsed from the time of arrival to the departure of the traveler.

From the foregoing description of my present invention it will be clearly seen that I have devised a simply constructed and easily operated device which can be used for the purposes above stated for figuring any space in time for days and parts of days, but which may also be made for figuring the fractional part of any period of time in hours or parts of hours, or of the weeks, months or years. In fact, the device may be constructed for figuring any period or time which repeats itself, and the device may be further applied in the measurement of distances and other quantities in a manner similar to that outlined in the above.

I claim:—

1. A device for determining an elapsed space of time comprising a base provided with a single marginal scale, a disk movably disposed upon said base-plate, said disk being also provided with a marginal scale, a face-plate movably mounted upon said disk, an index extending from said disk, an index extending from said face-plate, said face-plate being also provided with a pointer, both of said indexes co-acting with the scale upon said base and said pointer being arranged that the result is read on the scale mounted upon said disk opposite said pointer.

2. A device for determining an elapsed space of time comprising a base provided with a single marginal scale, a disk movably disposed upon said base-plate, said disk being also provided with a marginal scale, a face-plate movably mounted upon said disk, said face-plate having a marginal cut-away portion arranged so as to expose a part of the scale upon said disk, an index extending from said disk, an index extending from said face-plate at the one end of said cut-away portion, said face-plate being also provided with a pointer mounted midway between the ends of said cut-away portion, both of said indexes co-acting with the scale upon said base and said pointer being arranged that the result is read on the scale mounted upon said disk opposite said pointer.

In testimony, that I claim the invention set forth above I have hereunto set my hand this 23 day of Feb. 1909.

WILLIAM C. SERRELL.

Witnesses:
W. D. RICE,
W. E. OLIVER.